March 10, 1953

A. L. FOX 2,631,116

ELECTRODES FOR ELECTRICAL AND
ELECTROCHEMICAL SYSTEMS
Filed Feb. 1, 1950

$MNO_2$ PRESSED AT $500°C$

INVENTOR
Abraham L. Fox

BY

ATTORNEY

Patented Mar. 10, 1953

2,631,116

UNITED STATES PATENT OFFICE 2,631,116

ELECTRODES FOR ELECTRICAL AND
ELECTROCHEMICAL SYSTEMS

Abraham L. Fox, Washington, D. C., assignor to
Manganese Battery Corporation, Riverdale,
Md., a corporation of Delaware Application February 1, 1950, Serial No. 141,814

2 Claims. (Cl. 136—138)

This invention relates to electrodes for electrical and electrochemical systems. It has for its purpose the provision of electrodes having unusual properties. These properties include unusually high oxygen over-voltage, high thermoelectric force against copper, a controllable electrical resistance, a controllable negative temperature co-efficient of electrical resistance, and a controllable type of electrical conduction.

The uses of an electrode having these various properties in a desired degree and in combination with other properties will be obvious to those skilled in the art. Specific uses will be pointed out and illustrated by examples in the present specification.

I have found that manganese dioxide when compressed into pellets has a wide range of electrical and electrochemical properties depending on its method of preparation, its purity and its physical state. The technical and patent literature are replete with data indicating this wide range of electrical properties. However, the electrical conductivity of manganese dioxide, as heretofore measured and recorded in the literature, has never been less than about 100 ohms per $cm.^3$ and, as a matter of fact, substantially all measurements which have been recorded in the literature give a very much higher figure for the specific electrical resistance. Resistances as high as $10^6$ ohms per $cm.^3$ have been recorded by A. A. Somerville in Metallurgical and Chemical Engineering, vol. 10, page 422 (1912). P. Fischer has measured the resistance of compressed manganese dioxide as 1469 ohms per $cm.^3$. This result will be found in Zeitschrift fur Electrochemie, vol. 32, page 538 (1926). The lowest resistance which we have found recorded in the literature is 100 ohms per $cm.^3$, which result was reported by Le Blanc and Sachse in Physikalische Zeitschrift, vol. 32, page 887 (1931).

Figure 1:
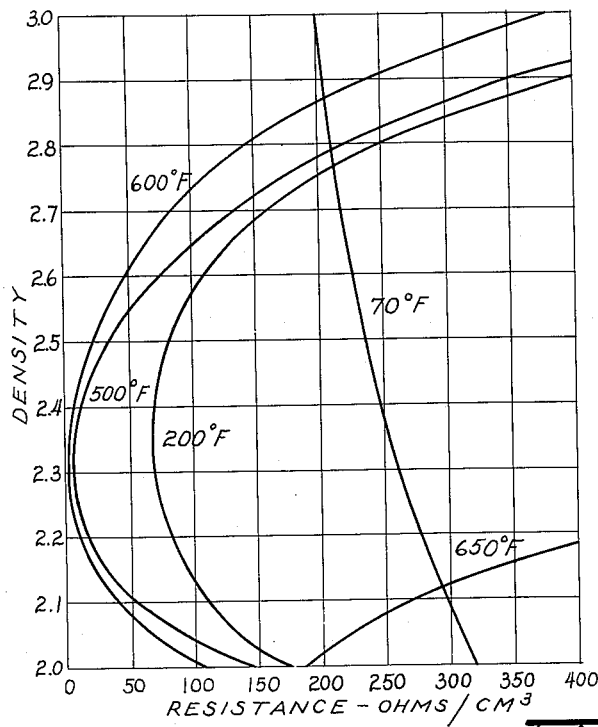
Figure 2:
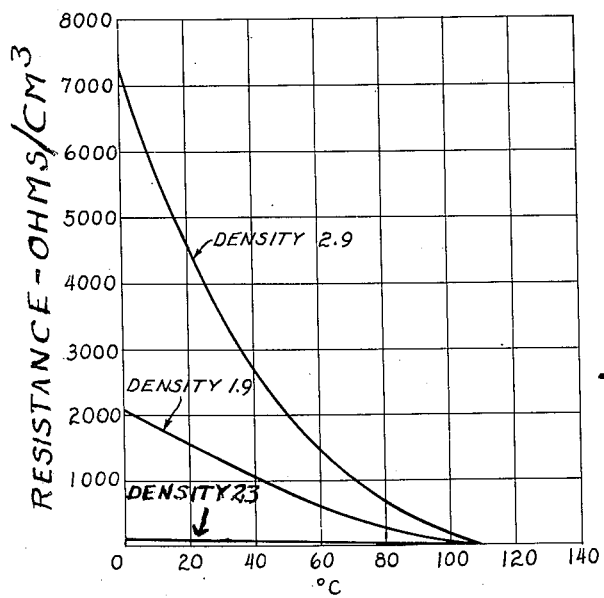

I have made an extensive study of the electrical resistance of various samples of manganese dioxide. I have found that, in general, the lowest electrical resistances are found in the purest oxides which have been reduced to the finest possible size before pressing. In Figure 1 I have illustrated the electrical resistance of compressed pellets of a highly pure manganese dioxide. In Figure 2 is illustrated the temperature co-efficient of electrical resistance for three conditions of preparing a compressed pellet of manganese dioxide. The electrical resistance is shown in Figure 1 in its relationship to the density of the pellets which is obtained by compressing under various pressures. In this instance the pressures used varied from about 5 tons per square inch to about 125 tons per square inch. I have given this as an illustration of the behavior of pure manganese dioxide when compressed at room temperature. These results are in line with what would be expected from the known art and I make no claim to any invention in the preparation of electrodes from compressed pellets of manganese dioxide when such compression is carried on at substantially atmospheric pressures.

I have found, however, that when the compressing of the manganese dioxide is carried out at elevated temperatures entirely unexpected results are obtained. I have found that compressing at elevated temperatures leads to an unexpectedly great decrease in the electrical resistance of the pellet provided the pressure applied is within certain critical limits which depend on the temperature. It should be pointed out that throughout this application we will refer to the electrical resistance of the compressed pellets after they have been restored to atmospheric temperature and pressure. We are not here concerned with the electrical resistance when under pressure. The effect of pressure is, of course, to increase the density. However, the effect on electrical resistance cannot be attributed to the combined effect of temperature and pressure upon density. This will be made perfectly clear from an examination of Figure 1, where I have plotted the electrical resistance as a function of the density of the pellets for various temperatures of preparation. The different densities, of course, are obtained by compressing under different pressures.

In general, the pressure necessary to obtain a given density is less, the higher the temperature. The range of densities with which we are concerned in the present invention, namely 1.8–3.0, can be obtained with pressures varying from 5–60 tons/sq. in. The time under pressure has relatively little effect. In any case I prefer to use the density obtained as the criterion of the effectiveness of the pressing operation. There are several unusual and entirely unexpected results which are illustrated by Figure 1. It will be seen that the electrical resistance passes through a minimum at a density of approximately 2.4. This minimum is lower, the higher the temperature. The minimum also seems to be broader at higher temperatures. The existence of such a minimum finds an explanation in the change of the mechanism of electrical conduction which will be discussed later. It is interesting that compression to produce a density on either side of the minimum may actually increase the resistance very much above that which is obtained by compressing the same material at room temperature. In Figure 1 the scale on which the results have been plotted do not bring out the extent of this effect. It may be pointed out, however, that, for example, at 500° F. a pressure of 40 tons per square inch resulting in a density of 3.09 gives a pellet having a specific resistance of 28,000 ohms per cm.$^3$; while a pressure of 5 tons per square inch giving a density of 1.46 shows a specific resistance of 4600 ohms per cm.$^3$. As shown in the figure, the minimum resistance obtained at a density of approximately 2.4 and a pressure of a little over 30 tons is 10 ohms per cm.$^3$.

In the figure I have shown results only up to a temperature of 600° F., at which temperature the minimum specific resistance is approximately 5 ohms per cm.$^3$. The upper limit for the effective practice of this part of my invention is about 700° F. since above this temperature there is some decomposition of the manganese dioxide which affects the electrical resistance adversely.

I have found that the electrical and electrochemical properties of the compressed manganese dioxide fall into three general groups according to whether the compressed material is made at pressures substantially less than that required for the minimum electrical resistance, in the general range of such electrical resistance, or under conditions where electrical resistance has been substantially increased by the use of high pressures. The temperature co-efficient of electrical resistance for these three conditions of preparing the compressed pellet of manganese dioxide is shown in Figure 2. From this figure it will be seen that the material having an electrical resistance near the minimum has comparatively low temperature co-efficient of electrical resistance. Material produced at quite high pressures has a much higher temperature co-efficient of electrical resistance and material produced at pressures below that required to give the minimum electrical resistance has an intermediate value of temperature co-efficient.

Since all the temperature co-efficients are negative, it is indicated that the material belongs to the class of substances known as semi-conductors. Such semi-conductors are classified in two groups, those in which the conduction is due to negative carriers and those in which the electricity is carried by positive carriers. These are usually referred to as N and P type semi-conductors. They can be distinguished by the nature of the unsymmetrical resistance which is established by placing the electrode between a good conducting contact, such as a silvered surface, and a point contact. Under these conditions an N type semi-conductor will show a lower resistance when the point contact is positive, a higher resistance when the point contact is negative. A P type semi-conductor will show the reverse.

By the application of this test I have established that the manganese dioxide pellets having low electrical resistances are semi-conductors of the P type, while the pellets produced at high and low pressures are N type semi-conductors. I have found that compressed pellets of manganese dioxide having resistances near the minimum have an exceedingly high thermoelectric force as measured against copper. This thermoelectric force is in the order of 1 millivolt per degree centigrade. Such extremely high thermoelectric force when combined with the relatively low electrical resistance has many uses in the arts.

The electrochemical properties of the manganese dioxide pellets having resistance near the minimum obtainable are also of great commercial value. I have found that the oxygen over voltage of such compressed pellets when made an electrode in dilute sulphuric acid is very high, the voltage required to evolve oxygen being about 2.2 volts. This compares to approximately 1.5 volts for graphite.

The electrode potential of such low resistance compressed pellets of manganese dioxide is also highly unusual. The potential of such pellets, when made from gamma $MnO_2$ as measured against a normal calomel electrode in an electrolyte of zinc and ammonium chloride and a pH of approximately 2.5, is .62 of a volt. This is a little less than that which is obtained with the same material in an uncompressed form. However, when the pH of the electrolyte is increased, the potential of the uncompressed material falls steadily until the potential against the normal calomel cell is practically zero when the electrolyte has a pH of 10. In the case of the low resistance pellets of manganese dioxide the electrode potential falls with increased pH only to about .44 of a volt at a pH of 10. With $MnO_2$ of the pyrolusite form such as that made from nitrate the potential at a pH of 2.5 is only .192 but falls at a pH of 10 only to .16.

It is obvious, therefore, that the electrochemical reaction is different than that of the usual manganese dioxide-graphite electrode. I have found that if the compressed pellets be finally ground they behave, with regard to electrode potential substantially, as if they have not been compressed. On the other hand, fragments of the pellets in relatively coarse form behave like the pellets themselves. As a practical matter, an electrode may be prepared by pressing the fragments into a compact mass with graphite. In this way, an electrode having the properties of the compressed pellets together with a large surface and low electrical resistance can be obtained. In my co-pending application, Serial No. 141,813, filed February 1, 1950, which has matured as Patent No. 2,591,532 issued April 1, 1952, I have disclosed such electrodes as depolarizers for primary cells.

The results which have been described were obtained using manganese dioxide prepared by oxidizing the pure carbonate and leaching with dilute acid. This material was pure hydrated manganese oxide having a gamma structure and an available oxygen corresponding to 88.2% $MnO_2$. Substantially identical results so far as electrical properties are concerned have been obtained with other forms of substantially pure manganese dioxide. These include commercial electrolytic manganese dioxide and manganese dioxide prepared by decomposition of manganous nitrate. The electrochemical results, however, are different when the pyrolusite form of manganese dioxide, such as that obtained by nitrate decomposition, is used rather than the gamma form.

What is claimed is:

1. A compressed pellet of manganese oxide having a manganese oxygen ratio of at least 1.8, a density of 2.0 to 2.7 and having a specific resistance of less than 100 ohms per centimeter cubed and a negative temperature coefficient of electrical resistance.

2. As an article suitable for an electrode a compressed pellet of manganese dioxide having a density of 2.0 to 2.7 and electrical resistance of less than 100 ohms per centimeter cubed and negative temperature coefficient of electrical resistance.

ABRAHAM L. FOX.

REFERENCES CITED

The following references are of record in the file of this patent:

UNITED STATES PATENTS

| Number | Name | Date |
|---|---|---|
| 1,303,843 | Antonoff | May 20, 1919 |
| 1,322,001 | Ellis | Nov. 18, 1919 |
| 1,872,902 | Crowley | Aug. 23, 1932 |
| 2,462,162 | Christensen et al. | Feb. 22, 1949 |
| 2,491,320 | Koontz | Dec. 13, 1949 |

OTHER REFERENCES

Copeland et al., "Preparation of a Dry Cell Depolarizer by Air Oxidation of Manganous Hydroxide," pages 127–132 of the Transactions of the Electrochemical Society, vol. 92, 1947.